United States Patent [19]

Assaf

[11] Patent Number: 4,617,800

[45] Date of Patent: Oct. 21, 1986

[54] APPARATUS FOR PRODUCING POWER USING CONCENTRATED BRINE

[75] Inventor: Gad Assaf, Rehovot, Israel

[73] Assignee: Geophysical Engineering Company, Seattle, Wash.

[21] Appl. No.: 719,870

[22] Filed: Apr. 4, 1985

[51] Int. Cl.$^4$ .............................................. F01K 19/10
[52] U.S. Cl. ........................................ 60/689; 60/649
[58] Field of Search ................ 60/641.1, 641.2, 641.3, 60/641.6, 688, 689, 649

[56] References Cited

PUBLICATIONS

"Producing Electric Power from Concentrated Brine" published in *Desalinization*, 40 (Apr. 1982), 197–211 by M. Nadav and A. Ophir.

*Primary Examiner*—Allen M. Ostrager
*Attorney, Agent, or Firm*—Sandler & Greenblum

[57] ABSTRACT

A power plant includes a source of water, a heat exchanger having an evaporator side maintained below atmospheric pressure for converting the water to steam, and a turbine responsive to said steam for producing work and heat depleted steam. The heat exchanger also has a condenser side for receiving and condensing the heat depleted steam. The evaporator side of the heat exchanger is separated by a barrier from the condenser side. Concentrated brine from a source thereof is caused to fall in a film on the condenser side of the barrier, and water from the water source is caused to fall in a film on the evaporator side of the barrier. The heat of dilution of the film of concentrated brine, as it is directly contacted by the heat depleted steam in the condenser side of the heat exchanger, is transferred through the barrier from the condenser side to the evaporator side raising the temperature of the film of water on the evaporator side which evaporates in the reduced pressure in the evaporator. The cooled and diluted brine withdrawn from the condenser is reconcentrated in a constant enthalpy brine evaporator.

16 Claims, 4 Drawing Figures

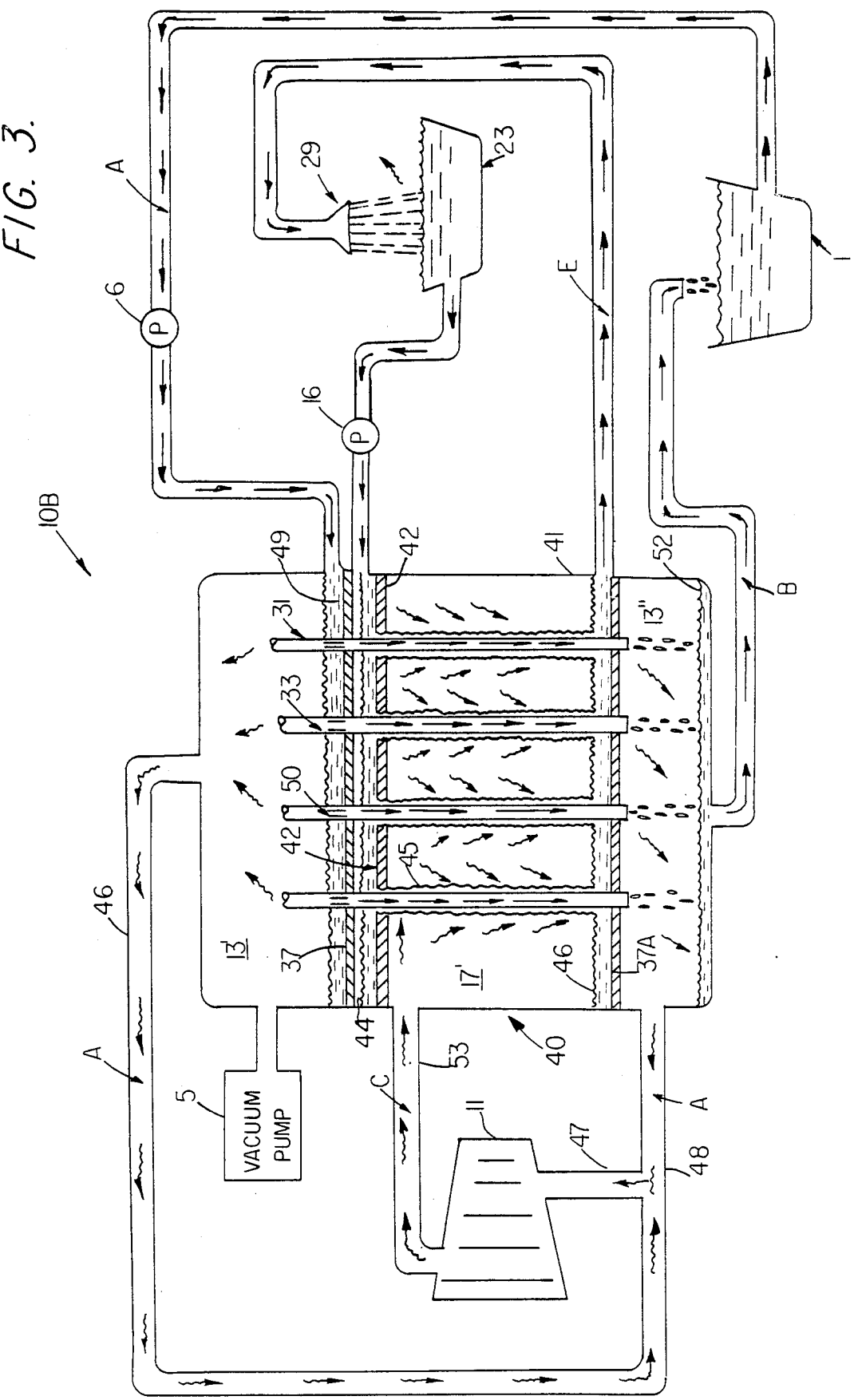

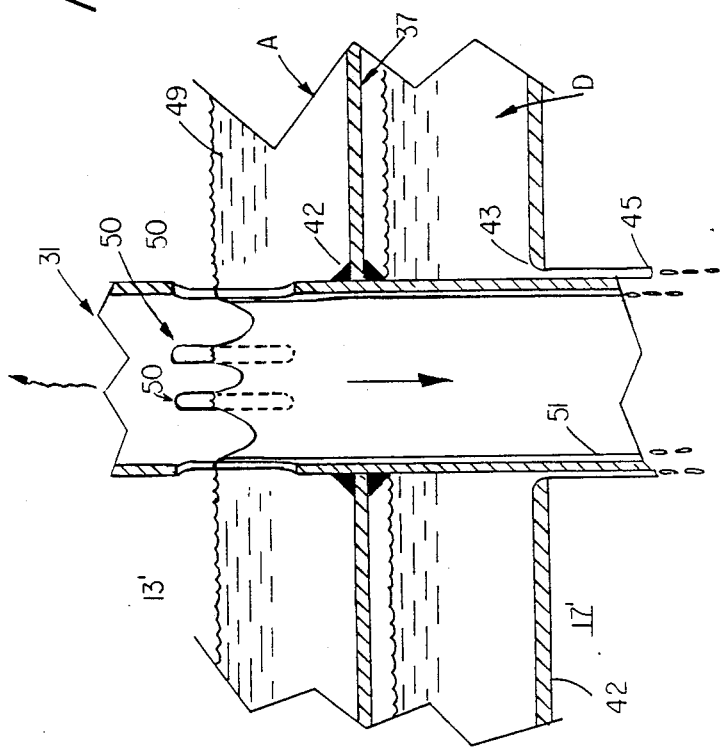

APPARATUS FOR PRODUCING POWER USING CONCENTRATED BRINE

DESCRIPTION

1. Field of the Invention

This invention relates to apparatus for producing power using concentrated brine.

2. Description of the Prior Art

An article entitled "Producing Electric Power from Concentrated Brines" published in *Desalinization*, 40 (1982), 197–211 by N. Nadav and A. Ophir describes a power plant, hereinafter referred to as a power plant of the type described, whose operation is based on the affinity of concentrated brine for water. Such power plant includes a flash evaporator for flashing water into steam, a steam turbine operating on steam supplied by the flash evaporator for generating power, a shell and tube heat exchanger for receiving the exhaust steam, a source of concentrated brine which is introduced into the heat exchanger as a film that falls over the horizontally disposed tubes and directly contacts the exhaust steam, and a pump for exchanging water between the flash evaporator and the tubes of the heat exchanger. Because of the affinity of concentrated brine for water vapor, the exhaust steam condenses on the brine film releasing the latent heat of condensation to the brine which is thus warmed as it is diluted. The warmed brine on the outside of the tubes heats the cooler water inside before the water is pumped into the flash evaporator.

The power plant described above is predicated on having an inexhaustable source of concentrated brine because the diluted brine is discarded and is not reconcentrated for reuse. The authors contemplate as their source of concentrated brine the 88 millions tons per day of end brine produced by the Dead Sea Works in Israel as a consequence of potash and other mineral production. As the authors show, diluting this end brine at a ratio of three parts of brine to one part vapor by weight will produce 40 MW of power. They propose a power plant that will produce 13.35 KW using 3 tons/hr of end brine which produces 4 tons/hr of dilute brine that is discarded. In order to produce this power, 250 tons/hr of water must be exchanged between the heat exchanger and the flash evaporator. This large flow of water reduces the thermal head by which the system operates and consumes a significant amount of power.

It is therefore an object of the present invention to provide a new and improved power plant of the type described in which the deficiencies described above are substantially overcome.

SUMMARY OF THE INVENTION

A power plant, according to the present invention, includes a source of liquid working fluid, such as fresh or brackish water, a heat exchanger having an evaporator side usually maintained below atmospheric pressure for converting liquid working fluid from said source into vaporized working fluid, and a turbine responsive to said vaporized working fluid for producing work and heat depleted vaporized working fluid. The heat exchanger also has a condenser side for receiving and condensing the heat depleted vaporized working fluid usually maintained below atmospheric pressure, its pressure being lower than the evaporator side.

The power plant also includes a source of concentrated brine, and means to exchange brine between the brine source and the condenser side of the heat exchanger for contacting brine with said heat depleted vaporized working fluid thereby condensing the latter and heating and diluting the contacted brine. The heat exchanger includes a heat conductive barrier that separates the heat exchanger into two compartments, one of which constitutes the condenser side, and the other of which constitutes the evaporator side. Concentrated brine from the brine source is caused to fall in a film on the condenser side of the barrier for effecting condensation of the heat depleted vaporized working fluid, such condensation releasing the latent heat of condensation to the brine which is warmed as it is diluted. Liquid working fluid from the source thereof is caused to fall in a film on the evaporator side of the barrier. Heat from the warmed brine film is transferred through the barrier to the cooler film of liquid working fluid which, under the reduced pressure in the evaporator side, flashes into vapor that is conducted to the turbine.

Thus, the heat exchanger of the present invention produces a falling film of concentrated brine on the condenser side of the barrier in the heat exchanger, and a falling film of water on the evaporator side of the barrier. The heat of dilution of the concentrated brine is transferred from the condenser side to the evaporator side through the barrier raising the temperature of the water on the evaporator side which evaporates in the reduced pressure in the evaporator. In this way, the necessity for a separate evaporator as used in the prior art is eliminated, and the efficiency of heat transfer in the apparatus of the present invention is enhanced over the prior art eliminating the need circulating a large volume of water between the condenser and evaporator as is the case in the prior art. As a result, the thermal head, i.e., the temperature difference across the condenser/evaporator is greater than in the prior art; and pumping losses are reduced.

The present invention also includes a constant enthalpy brine evaporator for concentrating dilute brine removed from the condenser side of the heat exchanger. This is a particularly energy-efficient way to utilize arid air to evaporate water vapor absorbed by the brine in the condenser, and permits the operation of the power plant on a self-sustaining basis.

BRIEF DESCRIPTION OF THE DRAWINGS

FIG. 3 is a schematic diagram of a system constituting a second embodiment of the present invention; and FIG. 4 is an enlarged, cut-away view of the embodiment of FIG. 3.

DETAILED DESCRIPTION OF THE PREFERRED EMBODIMENT

Figure 1:
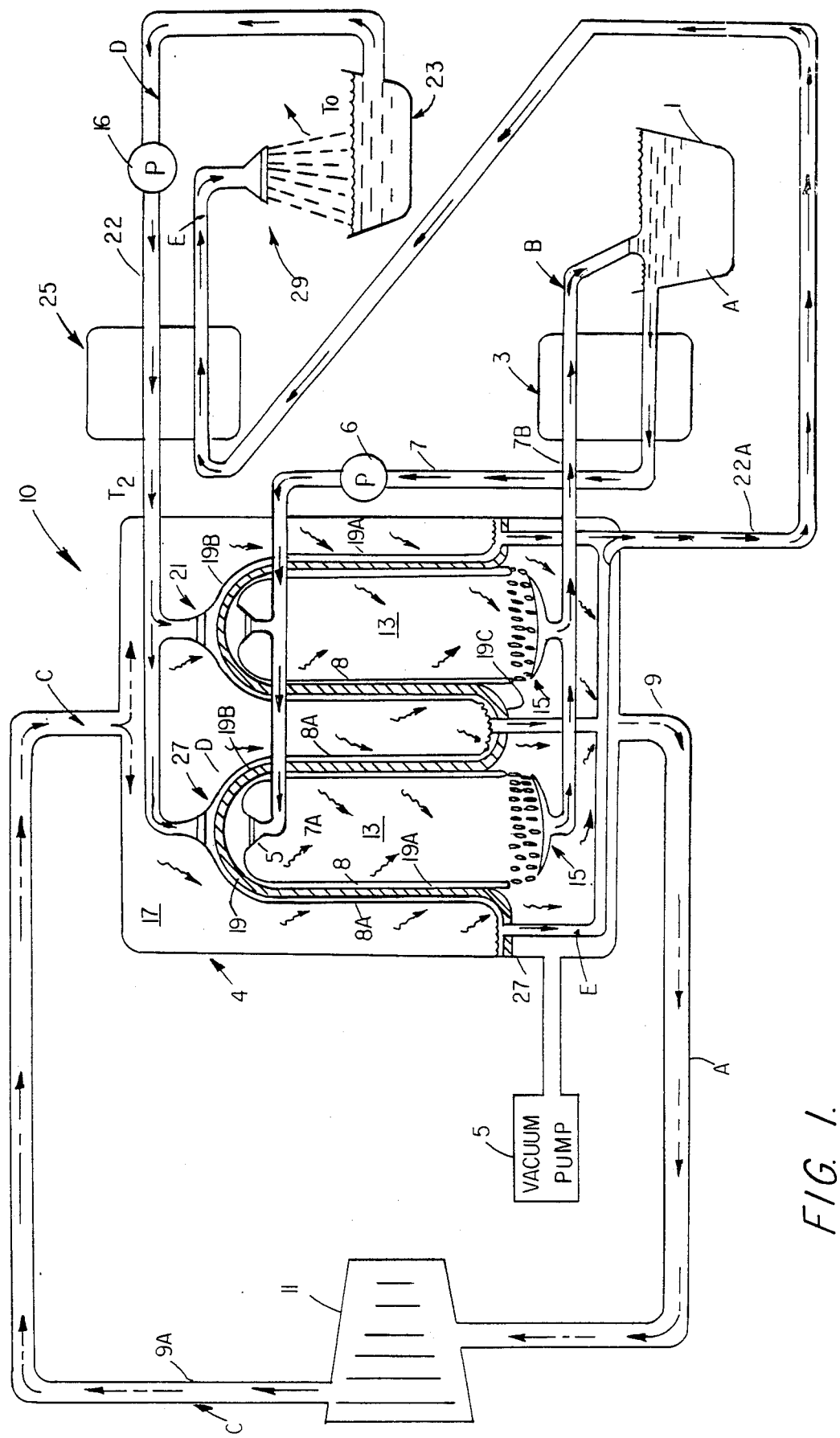
FIG. 1 is a schematic diagram of a system constituting a first embodiment of the present invention.

Referring now to FIG. 1, reference numeral 10 designates apparatus according to the present invention for producing power using concentrated brine. Apparatus 10 operates on working fluid from source 1 which schematically represents a river or sea of fresh or brackish water.

Apparatus 10 includes heat exchanger 4 having undulated barrier 19 that divides the heat exchanger into two separate chamber: lower evaporator chamber 13, which is usually maintained below atmospheric pressure, and upper condenser chamber 17 which is connected to vacuum pumps to extract the non-condensable gases (e.g. air). Barrier 19, which is formed of high heat conductivity metal, has a plurality of vertically-oriented runs 19A connected at their tops by rounded crests 19B, and at their bottoms by rounded troughs 19C.

Pump 6 delivers water from source 1 through conduit 7 to upwardly directed spray heads 7A aligned with but positioned below crests 19B. Thus, water from source 1 is sprayed against the crests and cascades, in laminar films, downwardly on the lower evaporator side of runs 19A. Because chamber 13 is under vacuum conditions, and because water in film 8 is heated, as described below, a portion of the water in film 8 flashes into steam which exits evaporator chamber 13 via conduit 9. Bowl-like catchers 15, located near the bottom of chamber 13, collect water that drains from barrier 19 and delivers the collected water to conduit 7B, which returns the collected water to source 1. Optional counter-flow heat exchanger 3, interposed between source 1 and collectors 15, is effective to transfer some of the heat contained in the water returned to the source to the water pumped from the source into the evaporator.

In addition to heat exchanger 4, apparatus 10 includes steam turbine 11 whose input nozzle ring (not shown) is connected to conduit 9. Turbine 11 extracts work from the steam and drives a generator (not shown) producing power and heat depleted steam that exhausts from the turbine via conduit 9A into condenser side 17 of heat exchanger 4.

Apparatus 10 also includes source 23 of concentrated brine such as a hygroscopic solution of $MgCl_2$ or $CaCl_2$. Pump 16 draws brine from source 23 through conduit 22, and delivers the brine to downwardly directed spray heads 21 that are located above and in alignment with the upper surfaces of rounded crests 19B. Thus, heads 21 spray brine on the crests; and the brine so-sprayed cascades downwardly over these crests falling in laminar film 8A on the upper condenser side of runs 19A. By reason of the hygroscopic nature of the the brine, water vapor in chamber 17 condenses on the brine film which is heated and diluted thereby.

The diluted brine is collected in troughs 19C of the barrier and returned via conduit 22A, through optional heat exchanger 25, to brine reconditioner 29 for reconcentrating the brine. Reconditioner 29 may be a conventional, shallow solar evaporation pond. Preferably, reconditioner 29 is in the form of a direct contact constant enthalpy heat exchanger of the type disclosed in copending application Ser. No. 609,312 filed May 11, 1984, which is a continuation-in-part of application Ser. No. 357,661 filed Mar. 12, 1982, the disclosures of which are hereby incorporated by reference. That is to say, the diluted brine is concentrated by contacting the diluted brine with air under the conditions that the heat content of the dilute brine is smaller than the heat content of the air, and the duration of contact is such that most of the water that evaporates from the dilute brine does so under conditions of constant enthalpy.

To achieve this, the mixing ratio of brine to air should be less than about 0.02. Preferably, the dilute brine is sprayed into the air above source 23 under conditions that the vapor pressure in the air is less than the vapor pressure at the liquid/air interface of the brine droplets to form a shower within which heat and vapor transfers take place. The droplets interact with the air such that all of the heat and vapor transfers occur under the condition that the latent heat flux due to evaporation of water from the brine droplets is substantially equal to the sensible heat flux due to heating of the air whereby the wet-bulb temperature at the liquid/air interface of the droplets is substantially constant and equal to the wet bulb temperature of the air. The size of the droplets and the size of the shower are selected such that the resident time of the droplets in the air is approximately equal to the time required for the temperature difference between the brine and the air to reach about 37% of the thermal head, which is the temperature difference between the brine and the bulk of the air when the air/brine interface and the bulk of the air come to the same wet-bulb temperature. Preferably, the radius of the droplets is less than about 0.2 mm.

In operation, brine D is drawn from source 23 at temperature $T_0$ and is pre-heated in heat exchanger 25 to temperature $T_2$. The concentrated brine $D_i$ is characterized by a vapor pressure lower than the vapor pressure of working fluid C at the same temperature. Brine vapor pressure in condenser chamber 17 is very low in comparison to the vapor pressure of the uncontaminated or brackish water in evaporator channel 13. This vapor pressure difference may be considered to be substantially the same as that between the evaporator and the condenser of a conventional heat engine using water as the working fluid, the temperature of the evaporator being the temperature of condenser compartment 17 (that is substantially at ambient air temperature) and the temperature of the condenser being the dew point temperature. When heat exchangers 3 and 25 are employed in the fluid circuits, the actual temperature of condenser compartment 17 and consequently the evaporator of a conventional heat engine will be greater than the ambient temperature $T_o$ by a factor $\Delta T$ where $\Delta T = T_2 - T_o$. The actual temperature of the condenser of a conventional heat engine likewise will be greater than the dew point temperature $T_d$ by the same factor $\Delta T$. The thermal gradient, the mechanism by which turbine 7 extracts work in the plant, can thus be considered to be the temperature difference between the evaporator and the condenser of the conventional heat engine mentioned above.

As brine film 8A cascades down the vertical runs 19A of the barrier, the vapor exhausted from turbine 11 (fluid C) condenses on the brine film warming and diluting the brine. Heat from the brine film is transferred through barrier 19 into water film 8 on the evaporator side of vertical runs 19A of the barrier. The temperature of water film 8 rises to $T_3$.

Diluted brine E, collected in troughs 19C, is conducted back through air/brine heat exchanger 29 which removes water added in the condenser thus reconcentrating the brine stored in source 23. Heated fluid B, i.e., the portion of fluid A that was not all vaporized, is collected in drains 15 and channeled back through heat exchanger 13 to pre-heat fluid A. Fluid B is then returned to source 1.

Figure 2:
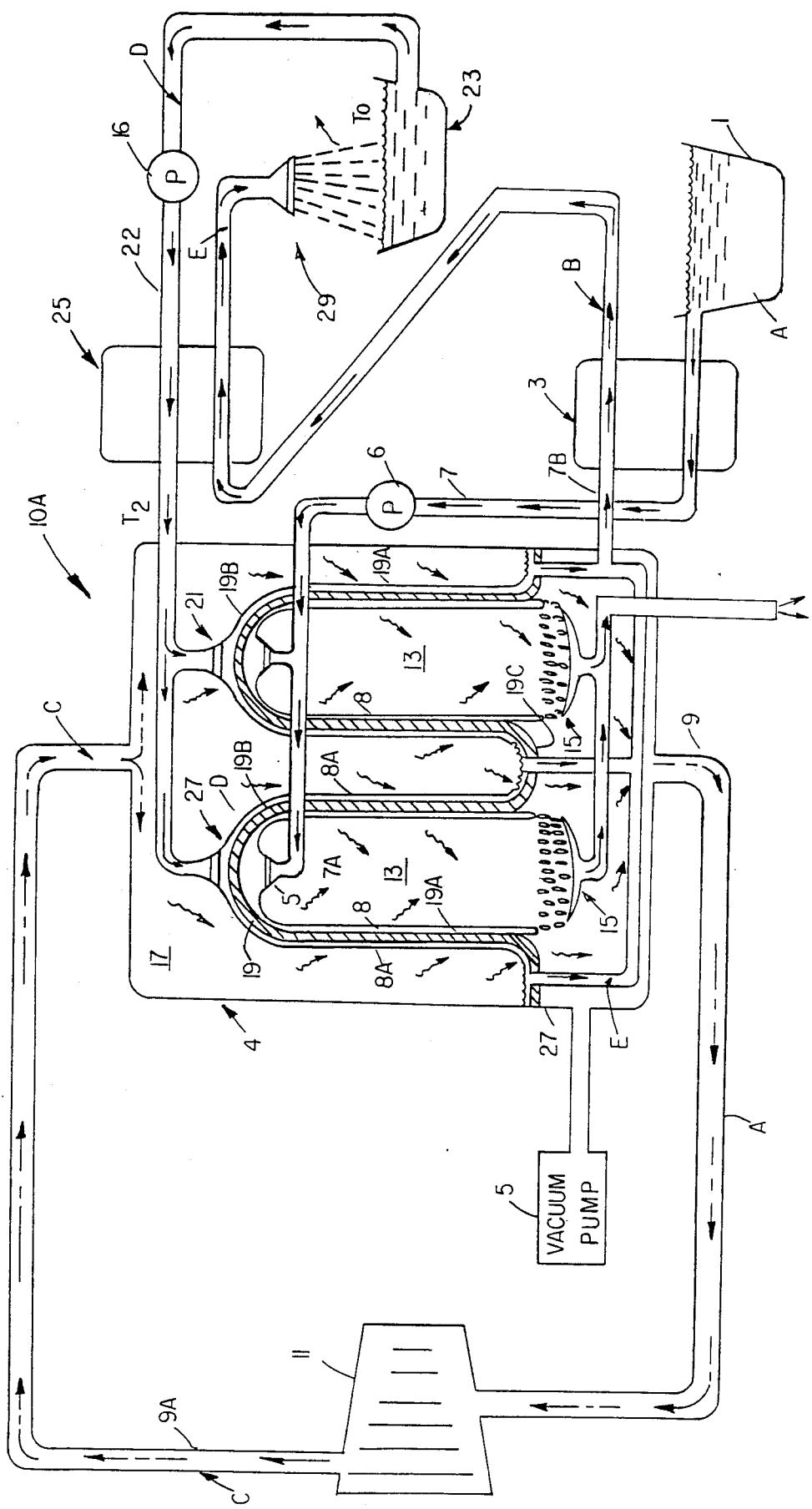
FIG. 2 is a schematic diagram of a system constituting a variant of the embodiment of FIG. 1.

In an alternative embodiment in FIG. 2, fluid B can be discarded or "blown-down" if the working fluid is plentiful. In such a case, diluted brine fluid E is passed through heat exchanger 3 in addition to heat exchanger 25 to pre-heat both working fluids A and concentrated brine D, respectively.

Heat exchangers 3 and 25 are optional and are used only to elevate the temperatures of the respective fluids in evaporator chamber 13 and condenser chamber 17, thus permitting a more compact steam turbine to be used. At higher temperatures, vapor pressures and fluid densities on both the evaporator and condenser sides will be larger. These elevated temperatures, however, in no way affect the enthalpy differential between the evaporator and condenser sides, and there is no increase in the efficiency of the system.

In a proposed design, the following parameters apply:
(1) temperature difference between the brine in source 23 and the water in source 1 is about 14° C.;
(2) steam temperature at the evaporator is about 30° C.;
(3) steam temperature at the turbine exhaust is about 20° C.;
(4) brine temperature in the condenser is about 34° C.;
(5) pressure in the evaporator is about 40 mb;
(6) pressure in the condenser is about 24 mb;
(7) thermal head across barrier 19 is about 4° C.;
(8) area of heat exchanger is 150 sq. m/ton/hr (vapor), or 10 sq. m/kW; and
(9) latent heat of evaporation is 656 kWh/ton vapor.

Assuming a Carnot efficiency of 33%, and a turbine efficiency of 80%, the electrical output of the turbine will be 17.3 kWh/ton vapor. The parasitic losses due to pumping will be about 0.1 kWh/ton, and the energy requirements of the brine concentration system described above is about 1.5 kWh/ton evaporated. Consequently, the net power output will be about 15.7 kWh/ton vapor.

A third embodiment of the invention is designated by reference numeral 10B in FIG. 3 to which reference is now made. This embodiment is substantially the same as apparatus 10 except for details of heat exchanger 40 which is generically the same as heat exchanger 4. Thus, heat exchanger 40 includes closed housing 41 having an internal barrier that separates the housing into first chamber 17', which operates as a condenser, and a pair of compartments 13' and 13" which, together constitute a second chamber which operates as an evaporator. In this case, the barrier is in the form of the walls of a plurality of vertically oriented tubes 31 open at each axial end, and a pair of spaced horizontal support plates 37 and 37A rigidly mounted inside the housing. Both top plate 37 and bottom plate 37A are perforated to receive tubes 31 which are welded in place, as indicated at 42 in FIG. 4. Because tubes 31 are open at their axial ends, chambers 13' and 13" are connected together and are maintained at subatmospheric pressure by the operation of vacuum pump 5.

Perforated plate 42 rigidly connected to housing 41 just beneath plate 37 is also perforated, but the perforations are larger in diameter than the O.D. of tubes 31. Header space 44 defined by plate 37 and plate 42 receives concentrated brine from source 23; and perforations 43 (FIG. 4) permit the concentrated brine to flow from the header space downwardly into chamber 17' in laminar film 45 that surrounds the tubes. Brine that reaches the bottom of the tubes collects in sump 46 that forms above plate 37A. Brine in this sump is pumped to reconditioner 29.

Upper compartment 13' is connected via conduit 46 to header 47 associated with the inlet to turbine 11; and lower compartment 13" is connected to this header via conduit 48. Finally, pump 6 delivers water from source 1 to reservoir 49 formed above plate 37. Tubes 31 are provided with peripheral slots 50 (FIG. 4) adjacent the upper free and thereof. The flow rate established by pump 6 is such that the upper surface of reservoir 49 includes slots 50; and as a result, water from the reservoir flows downwardly inside tubes 31 in laminar film 51. Water in film 51 drains into sump 52 at the bottom of housing 40 and the is returned to source 1.

In operation, water in film 51, which flows downwardly on the inside of tubes 31, flashes into steam by reason of the low pressure in compartments 13' and 13", and the steam is conducted to turbine 11 by conduits 46, 48. After expanding in the turbine, the steam is depleted in heat and is conducted to chamber 17' via conduit 53. In chamber 17', the exhaust steam condenses on brine film 45, which flows downwardly on the outside of tubes 31 and dilutes and warms the brine. The heat added to the brine is transferred through the walls of tubes 31 and thus heat water in film 51 flowing on the inside of the tubes.

The barrier that separates the evaporator and condenser chambers separates housing 40 into a first chamber that functions as a condenser, and a second chamber that functions as an evaporator. Specifically, the outer walls of tubes 31, on which concentrated brine flows as a falling film, constitute a portion of the first chamber which operates as a condenser. The inner walls of the tubes, on which water flows as a falling film, constitute a portion of a second chamber which operates as an evaporator.

From the foregoing description, one skilled in the art can easily ascertain the essential characteristics of the present invention, and, without departing form the spirit ans scope thereof, can make various changes and modifications of the invention to adapt it to various usages and conditions.

What is claimed is:

1. A power generating plant comprising:
(a) a source of liquid working fluid;
(b) a heat exchanger having an evaporator side for converting liquid working fluid from said source into vaporized working fluid;
(c) turbine means responsive to said vaporized working fluid for producing work and heat depleted vaporized working fluid;
(d) said heat exchanger having a condenser side for receiving said heat depleted working fluid;
(e) a source of concentrated brine;
(f) means to exchange brine between the brine source and said condenser side for contacting brine with said heat depleted vaporized working fluid thereby condensing the latter and heating and diluting the contacted brine;
(g) means for effecting the transfer of heat in said contacted brine in said condenser side to liquid working fluid in said evaporator side; and
(h) means for concentrating exchanged brine.

2. The invention defined in claim 1 wherein said heat exchanger comprises two chambers separated by a heat conductive barrier for establishing said condenser side maintained below atmospheric pressure which is defined by one surface of said barrier, and establishing said evaporator side, which is defined by the other surface of said barrier.

3. The invention defined in claim 2 wherein said means to exchange brine includes means to form a falling film of brine on said one surface of said barrier defining the condenser side of said heat exchanger for effecting condensation of said heat depleted working fluid on said film of brine, the heat of condensation and the sensible heat of said film of brine being transferred to said barrier.

4. The invention defined in claim 3 wherein said means to form a falling film includes spray headers for producing a laminar flow of brine over said one surface of said barrier defining the condenser side of said heat exchanger.

5. The invention defined in claim 4 including means to form a falling film of liquid working fluid from said source over said other surface of said barrier defining the evaporator side of said heat exchanger for effecting vaporization of said liquid working fluid due to heat transferred through said barrier.

6. The invention defined in claim 5 wherein said means for forming a falling film of working fluid comprises spray headers adapted to provide a laminar flow of working fluid over said surface of said barrier defining the evaporator side of said heat exchanger.

7. The invention defined in claim 6 wherein said barrier comprises an undulated member having a plurality of vertically-oriented runs connected at the top by rounded rests and at the bottom by rounded troughs, wherein said heat exchanger is constructed and arranged so that the upper surface of said member constitutes said one surface of the barrier and the lower surface of said member constitutes said another surface of the barrier.

8. The invention defined in claim 7 wherein said heat exchanger is provided with a first plurality of drains for collecting and discharging said falling film of brine after said heat depleted working fluid condenses thereon in said condenser side.

9. The invention defined in claim 7 wherein said heat exchanger is provided with a second plurality of drains for collecting and discharging liquid working fluid not vaporized in said evaporator side.

10. The invention defined in claim 8 further including means for pre-heating working fluid from said source of working fluid enroute to said evaporator side.

11. The invention defined in claim 9 further including means for pre-heating brine from said source of concentrated brine enroute to said condenser side.

12. The invention defined in claim 8 further including means for pre-heating working fluid from said source of working fluid enroute to said evaporator side.

13. The invention defined in claim 9 further including blow-down means for eliminating said working fluid discharged by said evaporator side.

14. The invention defined in claim 1 wherein said means for concentrating exchanged brine comprises a direct contact air/brine heat exchanger.

15. The invention defined in claim 14 wherein said direct contact air/brine heat exchanger comprises spray means for creating a brine shower in which evaporation takes place at constant enthalpy.

16. The invention defined in claim 14 wherein said direct contact air/brine heat exchanger comprises an evaporation pond.

* * * * *